United States Patent [19]

Stockton

[11] 4,028,965
[45] June 14, 1977

[54] MULTIPLE RATIO POWER TRANSMISSION MECHANISM ADAPTED FOR IMPROVED ENGINE FUEL ECONOMY AND HIGH/LOW RATIO TRACTION

[75] Inventor: Thomas R. Stockton, Ann Arbor, Mich.

[73] Assignee: Ford Motor Company, Dearborn, Mich.

[22] Filed: Dec. 9, 1974

[21] Appl. No.: 531,132

[52] U.S. Cl. .................................. 74/765; 74/687
[51] Int. Cl.² ....................................... F16H 57/10
[58] Field of Search ............ 74/765, 740, 730, 731, 74/732, 733, 687, 750 R

[56] References Cited

UNITED STATES PATENTS

| | | | |
|---|---|---|---|
| 2,869,400 | 1/1959 | Langdon | 74/765 |
| 3,564,938 | 2/1971 | Hause | 74/732 X |
| 3,830,117 | 8/1974 | Kodama et al. | 74/753 X |

Primary Examiner—Samuel Scott
Assistant Examiner—Frank H. McKenzie, Jr.
Attorney, Agent, or Firm—Donald J. Harrington; Keith L. Zerschling

[57] ABSTRACT

A planetary gear transmission having a hydrokinetic torque converter, a compound planetary gear unit and a simple planetary gear unit, an output shaft for the planetary gear units disposed concentrically with respect to the converter, and five friction clutches and brakes for establishing three forward driving ratios and a reverse ratio, the high ratio being characterized by a solid mechanical drive, the two lower ratios being defined in part by the converter and the lowest ratio and the reverse ratio being characterized by a relatively high value in comparison to planetary three-speed ratio transmission mechanisms of known construction.

6 Claims, 3 Drawing Figures

MULTIPLE RATIO POWER TRANSMISSION MECHANISM ADAPTED FOR IMPROVED ENGINE FUEL ECONOMY AND HIGH/LOW RATIO TRACTION

GENERAL DESCRIPTION OF THE INVENTION

My invention comprises a multiple-speed, planetary transmission mechanism for use with an internal combustion engine in an automotive vehicle driveline. It includes a compound planetary gear unit and a simple planetary gear unit with a minimum number of friction clutches and brakes for controlling ratio changes and a hydrokinetic torque converter located between the engine crankshaft and one input member of the gearing. Another input element of the gearing is connected directly to the engine through the impeller of the hydrokinetic torque converter. The torque converter provides a hydrokinetic torque delivery path during operation in the first and second speed ratios but is effectively bypassed during torque delivery as the transmission mechanism assumes a high speed ratio.

The reverse drive torque ratio and the low torque ratio are desirable high so that adequate wheel torque is achieved during reverse drive operation as well as during acceleration from a standing start. The ratio steps from the low ratio to the intermediate ratio and from the intermediate ratio to the high ratio are of a magnitude that permits a relatively smooth ratio transition during acceleration. The transmission mechanism is adapted to be bolted to the engine block of an internal combustion engine to form an assembly in which the output driving axis of the transmission and the engine crankshaft axis are coaxial. The common axis for the engine and the transmission is transversely arranged with respect to the vehicle centerline thereby permitting two output swing axles extending from either side of the assembly for independently suspended traction wheels.

PARTICULAR DESCRIPTION OF THE INVENTION

Figure 1A:
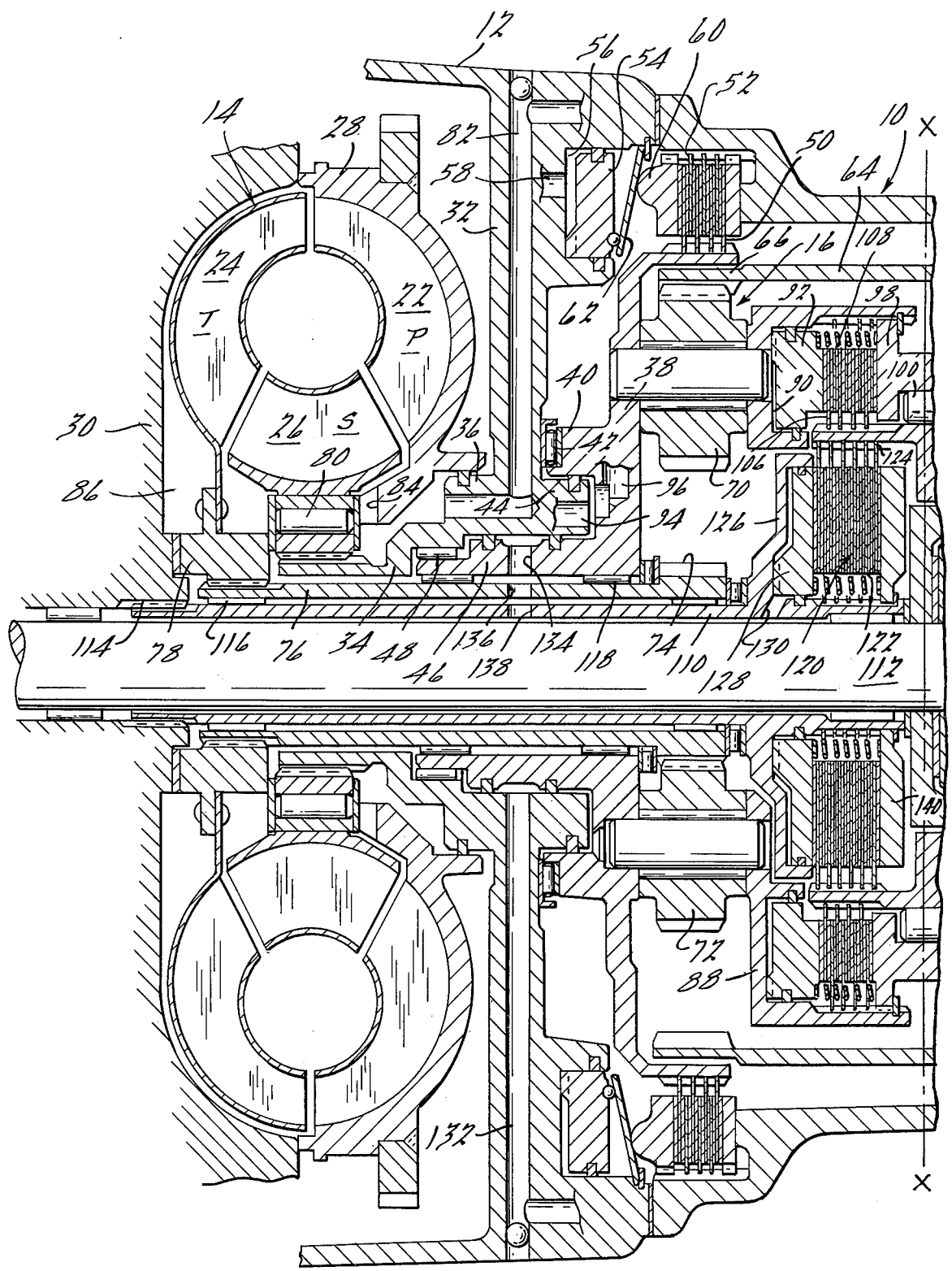
FIGS. 1A and 1B show in cross section an assembly of a planetary gear system and a hydrokinetic torque converter arranged in accordance with the teachings of my invention.
Figure 1B:
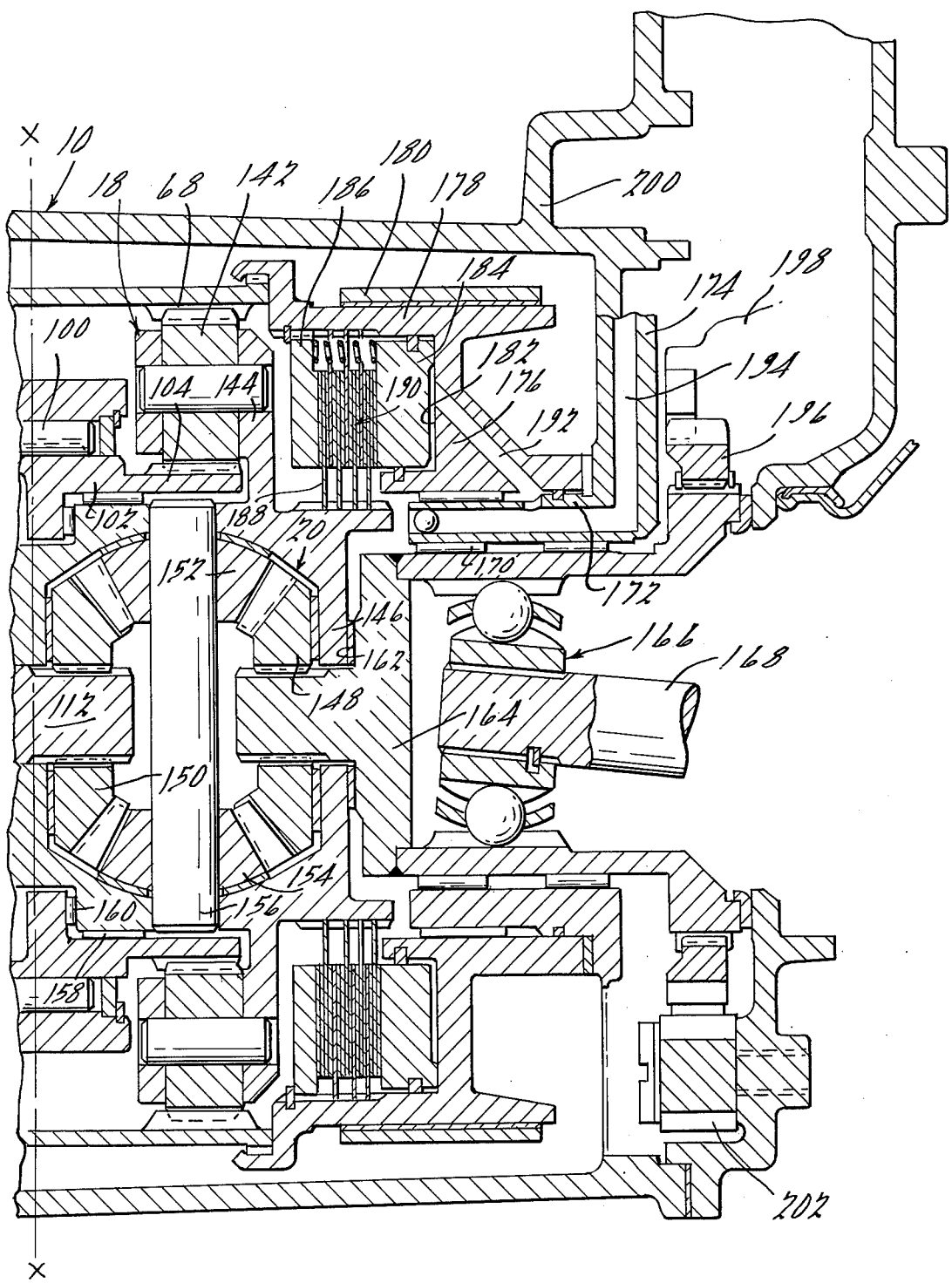

The numeral 10 designates in FIGS. 1A and 1B a main transmission housing which is adapted to be bolted at its left-hand margin to a converter housing 12, the latter enclosing a hydrokinetic torque converter 14. The main housing 10 encloses planetary gear units 16 and 18 and their associated clutches and brakes. It encloses also a differential gear unit 20. Each of these elements of the transmission mechanism will be described in the following paragraphs.

The converter 14 comprises an impeller 22, a turbine 24 and a stator 26, each having blades that define a toroidal fluid flow path. The impeller has a shell 28 that is connected driveably to the crankshaft 30 of an internal combustion engine.

The converter housing 12 has a forward wall 32 which carries a stator support sleeve 34 and which is formed with an impeller pilot shoulder 36. The carrier 38 for gear unit 16 includes a bearing shoulder 40 and a radial needle thrust bearing 42 situated between the shoulder 40 and the wall 32 to effect transfer of gear thrust forces to the housing. A pilot shoulder 44 registers with the bearing shoulder 40 to stabilize the carrier. Carrier 38 includes also a sleeve hub 46 which is journalled by bearing 48 within the stator support sleeve 34. Brake discs 50 are splined to the outer margin of the carrier 38. These cooperate with brakes discs 52 splined to the inner wall of the housing 10.

An annular brake piston is received within annular cylinder 56 formed in housing 10. The cylinder 56 and the piston 54 define pressure chambers to which pressure may be admitted by a clutch pressure distribution passage 58. The force acting on the piston 54 is transmitted to pressure plate 60 through Belleville spring 62 anchored on the housing 10 at its outer margin.

A ring gear drum 64 carries a pair of ring gears 66 and 68 for the gear units 16 and 18, respectively. Ring gear 66 meshes with planet pinions 70 which in turn mesh with planet pinions 72. Both pinions groups 70 and 72 are journalled on the carrier 38. Pinions 72 mesh with sun gear 74 formed on one end of turbine sleeve shaft 76. The left-hand end of the sleeve shaft 76 is splined to turbine hub 78.

During operation of the converter, turbine torque is delivered from the turbine to the sleeve shaft 76. The reaction torque on stator 26 is transmitted to stator sleeve shaft 34 through an overrunning brake 80 when the converter is in the torque conversion range. When the converter is used as a coupling, the overrunning brake 80 freewheels and the stator rotates in the direction of turbine rotation.

The converter and the engine lubrication system have a common pump and fluid supply system. Fluid is admitted to the converter circuit through feed passage 82 formed in the wall 32. The fluid circulates around the impeller hub and through radial flow passages 84 to the interior of the torus circuit. The outlet flow passage for the converter is defined in part by chamber 86 which communicates with the engine itself through passages not shown. One wall 88 of the carrier 38 defines an annular cylinder 90 in which is positioned annular piston 92. Fluid pressure is admitted to the working pressure chamber defined by the cylinder 90 and the piston 92 through passage 94 in the wall 32 and communicating passage 96 in the carrier 38. Crossflow passages, not shown, connect passage 96 to the working chamber behind the piston 92.

A reaction pressure plate 98 over the piston 92 serves as an outer race for overrunning clutch 100. The inner race for the clutch 100, which is identified by reference numeral 102, is formed integrally with sun gear 104 for the planetary gear unit 18. It is connected also to clutch discs 106 which cooperate with clutch discs 108 carried by the end wall 88 of the carrier 38. The clutch discs 106 and 108 are engaged during reverse drive operation as will be explained subsequently.

Sleeve shaft 110 surrounds output shaft 112 and is splined at its left-hand end to the engine crankshaft as shown at 114. Sleeve shaft 110 is journalled within the turbine shaft 76 by bushings 116 and 118. Shaft 110, at its right-hand end, may be clutched to the inner clutch race 102 by selectively-engageable, third speed ratio clutch 120. This clutch 120 comprises clutch discs 122 splined to the right-hand end of shaft 110. Clutch discs 124 are splined to inner race 102. An annular cylinder 126 formed on the right-hand end of the shaft 110 receives an annular piston 128. The pressure chamber behind the piston 128 is in fluid communication with the annular space between the shaft 112 and the sleeve shaft 110 through feed port 130.

Clutch actuating pressure is distributed to the clutch 120 through feed passage 132 located in the wall 32. This passage communicates with ports 134, 136 and 138 formed in sleeves 46, 76 and 110, respectively. Clutch reaction forces are transmitted to reaction plate 140 carried by the right-hand end of the sleeve shaft 110.

The planetary gear unit 18 includes pinions 142 which mesh ith ring gear 68 and sun gear 104. Pinions 142 are carried by carrier 144, which is formed integrally with differential carrier housing 146. Differential side gears 148 and 150 located within the housing 146 mesh with differential pinions 152 and 154 which are journalled on pinion shaft 156. Shaft 156 is supported in openings formed in housing 146. The entire housing assembly is journalled by bushing 158 and by thrust bearings 160 and 162 for rotation about the axis of the shaft 112.

Side gear 150 is splined to the shaft 112 and side gear 148 is splined to universal joint drive plate 164. A universal joint drive assembly 166 forms a driving connection between drive plate 164 and axle shaft 168. Drive plate 164 is journalled by bushings 170 in support sleeve 172 carried by end wall 174 of the housing 10.

Sleeve 172 provides a rotary bearing support for the hub 176 for reaction brake drum 178. Brake band 180 surrounds the drum 178. This drum is connected in fixed relationship to the sun gear drum 64.

Brake drum hub 176 defines an annular cylinder 182 in which is positioned an annular piston 184. Reaction disc 186 is carried by the drum 178. Brake disc 188 and the cooperating brake discs carried by the drum 178 form a reaction brake 190 that is engaged during operation in reverse and in the third speed ratio. Brake 190 is engaged when fluid pressure is admitted to the cylinder 182 through pressure feed passage 192, which is in fluid communication with passage 194 formed in the wall 174.

A governor drive gear 196 is carried by universal joint assembly 166. It driveably engages a governor assembly shown in part at 198 which is adapted to be mounted rotatably in housing portion 200 of the housing 10. Gear 196 engages also a speedometer drive gear 202 journalled in the lower portion of the housing 10. The governor 198 provides a speed pressure signal that is used by the automatic control valve system, not shown, to initiate clutch and brake engagement.

Figure 2:
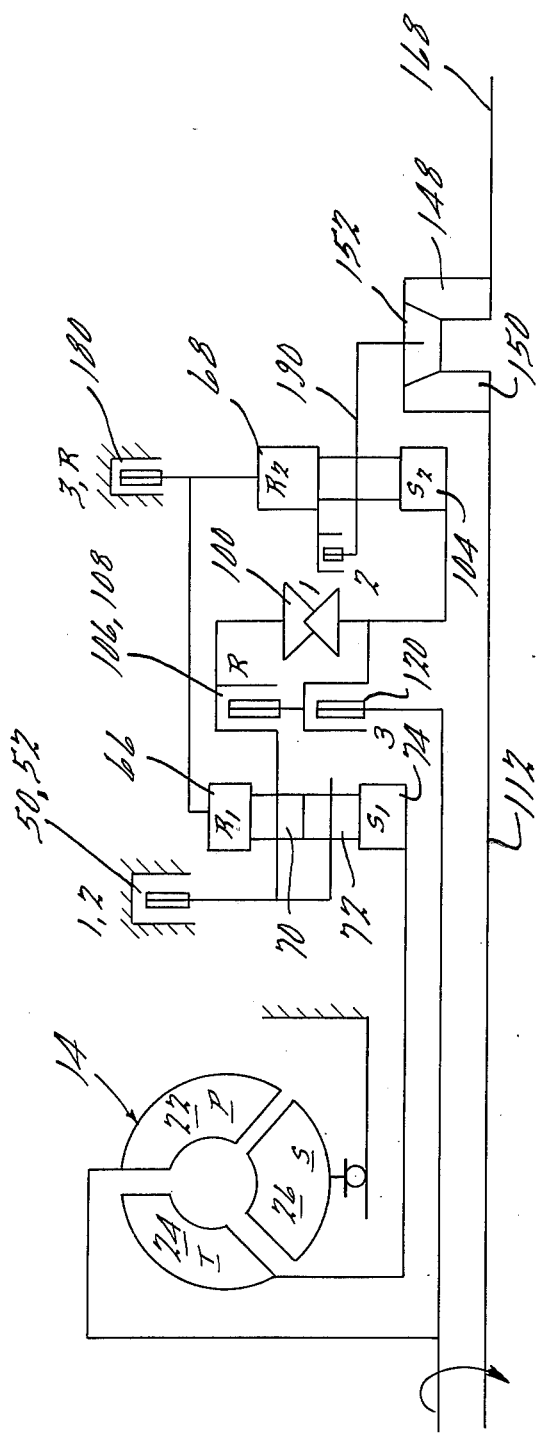
FIG. 2 is a schematic representation of the transmission structure of FIGS. 1A abd 1B.

The mode of operation of the mechanism shown in FIG. 1 will be described with reference to FIG. 2. The brake shown in part at 50 and 52 carries the symbols 1 and 2 in FIG. 2 to indicate that it is engaged during first speed ratio operation and second speed ratio operation. The brake shown at 180 in FIG. 1 carries the reference symbols 3 and R in FIG. 2 to indicate that it is engaged during the third speed ratio operation and during reverse drive operation. The clutch 120 carries the symbol 3 in FIG. 2 to indicate that it is engaged during third speed ratio operation. The clutch shown in FIG. 1 in part at 106 and 108 carries the symbol "R" in FIG. 2 to indicate that it is engaged during reverse drive operation. Clutch 190 carries the numeral "2" in FIG. 2 to indicate that it is engaged during second speed operation. The overrunning clutch 100 transmits torque during first speed ratio operation but freewheels during operation in other ratios.

During operation in the first speed ratio the compound carrier for the planetary gear unit 16 is anchored. Turbine torque delivered to the sun gear 74 results in forward motion of the ring gear 66 and the ring gear 68. Sun gear 104 is held stationary because it is anchored against rotation by the overrunning clutch 100, the outer race of which is connected to the anchored carrier for the gear unit 16. To effect a transition from the first speed ratio to the second speed ratio, clutch 190 is engaged while brakes 50 and 52 remain applied. All of the speed reduction then occurs in the first gear unit 16 since the second gear unit 18 is locked up for operation with a speed ratio of unity. In a typical example, the intermediate speed ratio is 3.5, which represents a speed ratio step of 1.7 as indicated in the chart below the schematic drawing in FIG. 2.

High speed ratio is achieved by releasing the brake 50 and 52 and applying brake band 180 which anchors the ring gear 68. Clutch 120 is applied causing engine torque to be delivered directly to the sun gear 104. In a typical embodiment the speed ratio during high speed ratio operation is 2.42, which represents a ratio step of 1.45 from the intermediate ratio as indicated in the chart of FIG. 2. The torque converter 14 is effectively bypassed during operation in high since the sun gear 74, to which the turbine 24 is connected, merely freewheels.

When the clutch 106 and 108 is applied to effect reverse operation, brake 180 is applied to anchor the ring gear 68. Turbine torque delivered to the sun gear 74 will cause reverse rotation of the compound carrier for the gear unit 16. This reverse motion is transmitted to the sun gear 104, which causes reverse motion of the carrier 190.

Output shaft 112 extends through the engine crankshaft and at its outboard end it carries a universal joint similar to the one illustrated in FIG. 1B at 166.

Having thus described a preferred embodiment of my invention, what I claim and desire to secure by U.S. Letters Patent is:

1. A transmission mechanism for an automotive vehicle comprising a hydrokinetic unit having an impeller and a turbine situated in toroidal fluid flow relationship, a pair of planetary gear units, a first of said planetary gear units having compound planet pinions rotatably mounted on a common carrier, a sun gear and a ring gear meshing with said compound planet pinions, the other gear unit being a simple planetary gear unit having a ring gear, a sun gear, a carrier and planet pinions mounted on the carrier in meshing engagement with said last mentioned ring and sun gears, first brake means for anchoring the common carrier of said first gear unit during first and second speed ratio operation, other brake means for anchoring the ring gears of said gear units during operation in the third speed ratio and reverse drive ratio, first coupling means for connecting driveably said compound carrier to the sun gear of said second gear unit during first speed ratio operation, second clutch means for locking up said second gear unit during intermediate speed ratio operation, high speed ratio clutch means for connecting directly said impeller to the sun gear of said second gear unit during third speed ratio operation thereby effecting a solid mechanical drive that bypasses said hydrokinetic unit, and reverse clutch means for connecting together said compound carrier to the sun gear of said second planetary gear unit during reverse drive operation, the carrier for said second gear unit being connected to a driven portion of said mechanism, said first coupling means being an overrunning clutch adapted to connect the compound carrier of said first gear unit and the sun gear of said second gear unit and to accommodate torque transfer from the former to the latter in one direction while accommodating freewheeling motion in the opposite direction.

2. A power transmission mechanism for an automotive vehicle comprising a hydrokinetic torque converter and a planetary gear system having a first compound planetary gear unit and a second simple planetary gear unit, said converter comprising an impeller, a turbine and a stator situated in toroidal fluid flow relationship, said compound planetary gear unit having a ring gear, a sun gear and a set of planet pinions one of which engages said ring gear and the other of which engages said sun gear, said compound planet pinions being journalled together in a common carrier in meshing engagement, said second gear unit comprising a ring gear, a sun gear, a carrier and a set of planet pinions journalled on said carrier in meshing engagement with said second mentioned ring and sun gears, first brake means for anchoring said common carrier during first and second speed ratio operation, second brake means for anchoring said ring gears during operation in the third speed ratio and reverse drive ratio, first coupling means for connecting together the compound carrier and the sun gear for said second gear unit during first speed ratio operation, second coupling means for connecting together two elements of said second gear unit for rotation in unison during second speed ratio operation, third coupling means for connecting directly said impeller to the sun gear of said second gear unit, the carrier of said second gear unit being connected to a driven portion of said mechanism, said first coupling means being an overrunning clutch adapted to connect the compound carrier of said first gear unit and the sun gear of said second gear unit and to accommodate torque transfer from the former to the latter in one direction while accommodating freewheeling motion in the opposite direction.

3. A transmission mechanism for an automotive vehicle comprising a hydrokinetic unit having an impeller and a turbine situated in toroidal fluid flow relationship, a pair of planetary gear units, a first of said planetary gear units having a compound planet pinions rotatably mounted on a common carrier, a sun gear and a ring gear meshing with said compound planet pinions, the other gear unit being a simple planetary gear unit having a ring gear, a sun gear, a carrier and planet pinions mounted on the carrier in meshing engagement with said last mentioned ring and sun gears, first brake means for anchoring the common carrier of said first gear unit during first and second speed ratio operation, other brake means for anchoring the ring gears of said gear units during operation in the third speed ratio and reverse drive ratio, first coupling means for connecting driveably said compound carrier to the sun gear of said second gear unit during first speed ratio operation, second clutch means for locking up said second gear unit during intermediate speed ratio operation, high speed ratio clutch means for connecting directly said impeller to the sun gear of said second gear unit during third speed ratio operation thereby effecting a solid mechanical drive that bypasses said hydrokinetic unit, and reverse clutch means for connecting together said compound carrier to the sun gear of said second planetary gear unit during reverse drive operation, the carrier for said second gear unit being connected to a driven portion of said mechanism, said driven portion of said mechanism comprising a first output shaft extending concentrically through said gear units and said turbine in one direction and a second output shaft extending in the opposite direction in coaxial disposition with respect to said first output shaft, differential side gears connected to said output shafts, differential pinions connected to said side gears, and means for transferring torque from the carrier of said second gear unit to said differential pinions thereby effecting a differential drive between said last mentioned carrier and each output shaft.

4. A power transmission mechanism for an automotive vehicle comprising a hydrokinetic torque converter and a planetary gear system having a first compound planetary gear unit and a second simple planetary gear unit, said converter comprising an impeller, a turbine and a stator situated in toroidal fluid flow relationship, said compound planetary gear unit having a ring gear, a sun gear and a set of planet pinions one of which engages said ring gear and the other of which engages said sun gear, said compound planet pinions being journalled together in a common carrier in meshing engagement, said second gear unit comprising a ring gear, a sun gear, a carrier and a set of planet pinions journalled on said carrier in meshing engagement with said second mentioned ring and sun gears, first brake means for anchoring said common carrier during first and second speed ratio operation, second brake means for anchoring said ring gears during operation in the third speed ratio and reverse drive ratio, first coupling means for connecting together the compound carrier and the sun gear for said second gear unit during first speed ratio operation, second coupling means for connecting together two elements of said second gear unit for rotation in unison during second speed ratio operation, third coupling means for connecting directly said impeller to the sun gear of said second gear unit, the carrier of said second gear unit being connected to a driven portion of said mechanism, said driven portion of said mechanism comprising a first output shaft extending concentrically through said gear units and said turbine in one direction and a second output shaft extending in the opposite direction in coaxial disposition with respect to said first output shaft, differential side gears connected to said output shafts, differential pinions connected to said side gears, and means for transferring torque from the carrier of said second gear unit to said differential pinions thereby effecting a differential drive between said last mentioned carrier and each output shaft.

5. A transmission mechanism for an automotive vehicle comprising a hydrokinetic unit having an impeller and a turbine situated in toroidal fluid flow relationship, a pair of planetary gear units, a first of said planetary gear units having compound planet pinions rotatably mounted on a common carrier, a sun gear and a ring gear meshing with said compound planet pinions, the other gear unit being a simple planetary gear unit having a ring gear, a sun gear, a carrier and planet pinions mounted on the carrier in meshing engagement with said last mentioned ring and sun gears, first brake means for anchoring the common carrier of said first gear unit during first and second speed ratio operation, other brake means for anchoring the ring gears of said gear units during operation in the third speed ratio and reverse drive ratio, first coupling means for connecting driveably said compound carrier to the sun gear of said second gear unit during first speed ratio operation, second clutch means for locking up said second gear unit during intermediate speed ratio operation, high speed ratio clutch means for connecting directly said impeller to the sun gear of said second gear unit during third speed ratio operation thereby effecting a solid mechanical drive that bypasses said hydrokinetic unit, and reverse clutch means for connecting together said compound carrier to the sun gear of said second planetary gear unit during reverse drive operation, the carrier for said second gear unit being connected to a driven portion of said mechanism, said first coupling means being an overrunning clutch adapted to connect the compound carrier of said first gear unit and the sun gear of said second gear unit and to accommodate torque transfer from the former to the latter in one direction while accommodating freewheeling motion in the opposite direction, said driven portion of said mechanism comprising a first output shaft extending concentrically through said gear units and said turbine in one direction and a second output shaft extending in the opposite direction in coaxial disposition with respect to said first output shaft, differential side gears connected to said output shafts, differential pinions connected to said side gears, and means for transferring torque from the carrier of said second gear unit to said differential pinions thereby effecting a differential drive between said last mentioned carrier and each output shaft.

6. A power transmission mechanism for an automotive vehicle comprising a hydrokinetic torque converter and a planetary gear system having a first compound planetary gear unit and a second simple planetary gear unit, said converter comprising an impeller, a turbine and a stator situated in toroidal fluid flow relationship, said compound planetary gear unit having a ring gear, a sun gear and a set of planet pinions one of which engages said ring gear and the other of which engages said sun gear, said compound planet pinions being journalled together in a common carrier in meshing engagement, said second gear unit comprising a ring gear, a sun gear, a carrier and a set of planet pinions journalled on said carrier in meshing engagement with said second mentioned ring and sun gears, first brake means for anchoring said common carrier during first and second speed ratio operation, second brake means for anchoring said ring gears during operation in the third speed ratio and reverse drive ratio, first coupling means for connecting together the compound carrier and the sun gear for said second gear unit during first speed ratio operation, second coupling means for connecting together two elements of said second gear unit for rotation in unison during second speed ratio operation, third coupling means for connecting directly said impeller to the sun gear of said second gear unit, the carrier of said second gear unit being connected to a driven portion of said mechanism, said first coupling means being an overrunning clutch adapted to connect the compound carrier of said first gear unit and the sun gear of said second gear unit and to accommodate torque transfer from the former to the latter in one direction while accommodating motion in the opposite direction, said driven portion of said mechanism comprising a first output shaft extending concentrically through said gear units and said turbine in one direction and a second output shaft extending in the opposite direction in coaxial disposition with respect to said first output shaft, differential side gears connected to said output shafts, differential pinions connected to said side gears, and means for transferring torque from the carrier of said second gear unit to said differential pinions thereby effecting a differential drive between said last mentioned carrier and each output shaft.

* * * * *